(12) United States Patent
Lin

(10) Patent No.: US 8,960,249 B2
(45) Date of Patent: *Feb. 24, 2015

(54) SELF-INFLATING TIRE

(71) Applicant: The Goodyear Tire & Rubber Company, Akron, OH (US)

(72) Inventor: Cheng-Hsiung Lin, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 177 days.

This patent is subject to a terminal disclaimer.

(21) Appl. No.: 13/651,719

(22) Filed: Oct. 15, 2012

(65) Prior Publication Data

US 2014/0102610 A1    Apr. 17, 2014

(51) Int. Cl.
*B60C 23/10* (2006.01)
*B60C 23/12* (2006.01)

(52) U.S. Cl.
CPC ............ *B60C 23/12* (2013.01); *B60C 23/10* (2013.01)
USPC .......................................... 152/426; 152/419

(58) Field of Classification Search
CPC ...... B60C 23/10; B60C 23/12; B60C 23/001; B60C 23/004
USPC .......................................... 152/419, 423–426
See application file for complete search history.

(56) References Cited

U.S. PATENT DOCUMENTS

| 638,628 | A | * | 12/1899 | Everett et al. ............... | 152/425 |
|---|---|---|---|---|---|
| 1,134,361 | A | * | 4/1915 | Wetherell ..................... | 152/426 |
| 3,304,981 | A | * | 2/1967 | Sheppard ...................... | 152/426 |
| 7,225,845 | B2 | * | 6/2007 | Ellmann ........................ | 152/426 |
| 8,042,586 | B2 | * | 10/2011 | Losey et al. .................. | 152/426 |
| 8,113,254 | B2 | * | 2/2012 | Benedict ...................... | 152/426 |
| 8,573,270 | B2 | * | 11/2013 | Hinque ......................... | 152/426 |
| 8,695,661 | B2 | * | 4/2014 | Delgado et al. ............... | 152/415 |
| 2014/0109405 | A1 | * | 4/2014 | Benedict et al. ............ | 29/888.02 |
| 2014/0110029 | A1 | * | 4/2014 | Benedict et al. ............. | 152/429 |

* cited by examiner

*Primary Examiner* — Jason Bellinger
(74) *Attorney, Agent, or Firm* — June E. Rickey

(57) ABSTRACT

A self-inflating tire assembly includes an air tube connected to a tire and defining an air passageway, the air tube being composed of a flexible material operative to allow an air tube segment opposite a tire footprint to flatten, closing the passageway, and resiliently unflatten into an original configuration. The air tube is sequentially flattened by the tire footprint in a direction opposite to a tire direction of rotation to pump air along the passageway to an inlet device for exhaust from the passageway or to an outlet device for direction into the tire cavity.

7 Claims, 11 Drawing Sheets

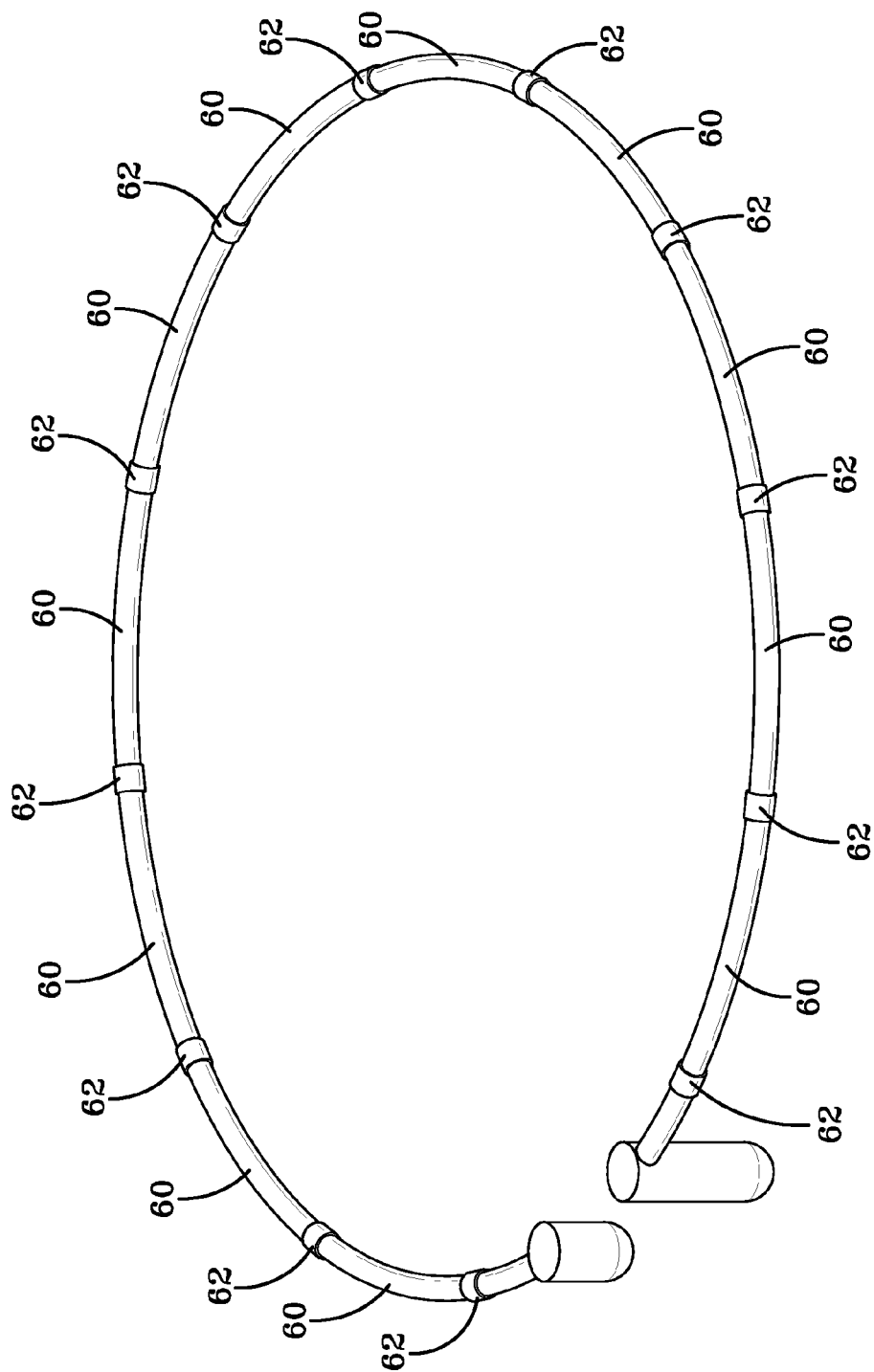

“Peristaltic” means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having shape adjacent grooves.

"Tread Arc Width" means the arc length of the tread as measured between the lateral edges of the tread.

SELF-INFLATING TIRE

FIELD OF THE INVENTION

The invention relates generally to self-inflating tires and, more specifically, to a pump mechanism for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

DEFINITIONS

"Aspect ratio" of the tire means the ratio of its section height (SH) to its section width (SW) multiplied by 100 percent for expression as a percentage. "Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

BRIEF DESCRIPTION OF THE DRAWINGS

The invention will be described by way of example and with reference to the accompanying drawings in which:

FIGS. 4-6 illustrate assembly of the pump assembly;

DETAILED DESCRIPTION OF THE INVENTION

Figure 1:
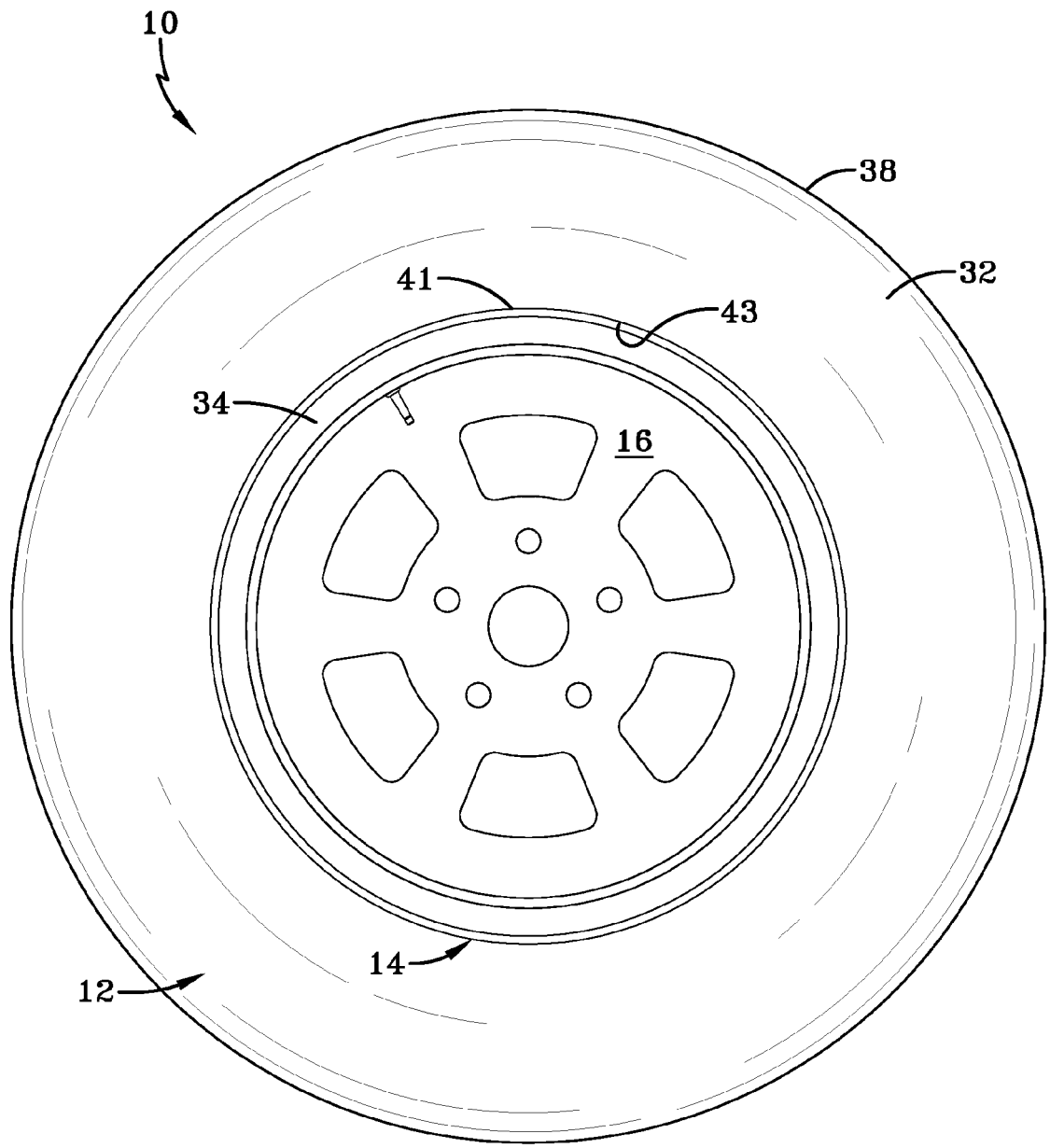
FIG. 1 is an side view of tire having a pump assembly mounted therein.
Figure 2:
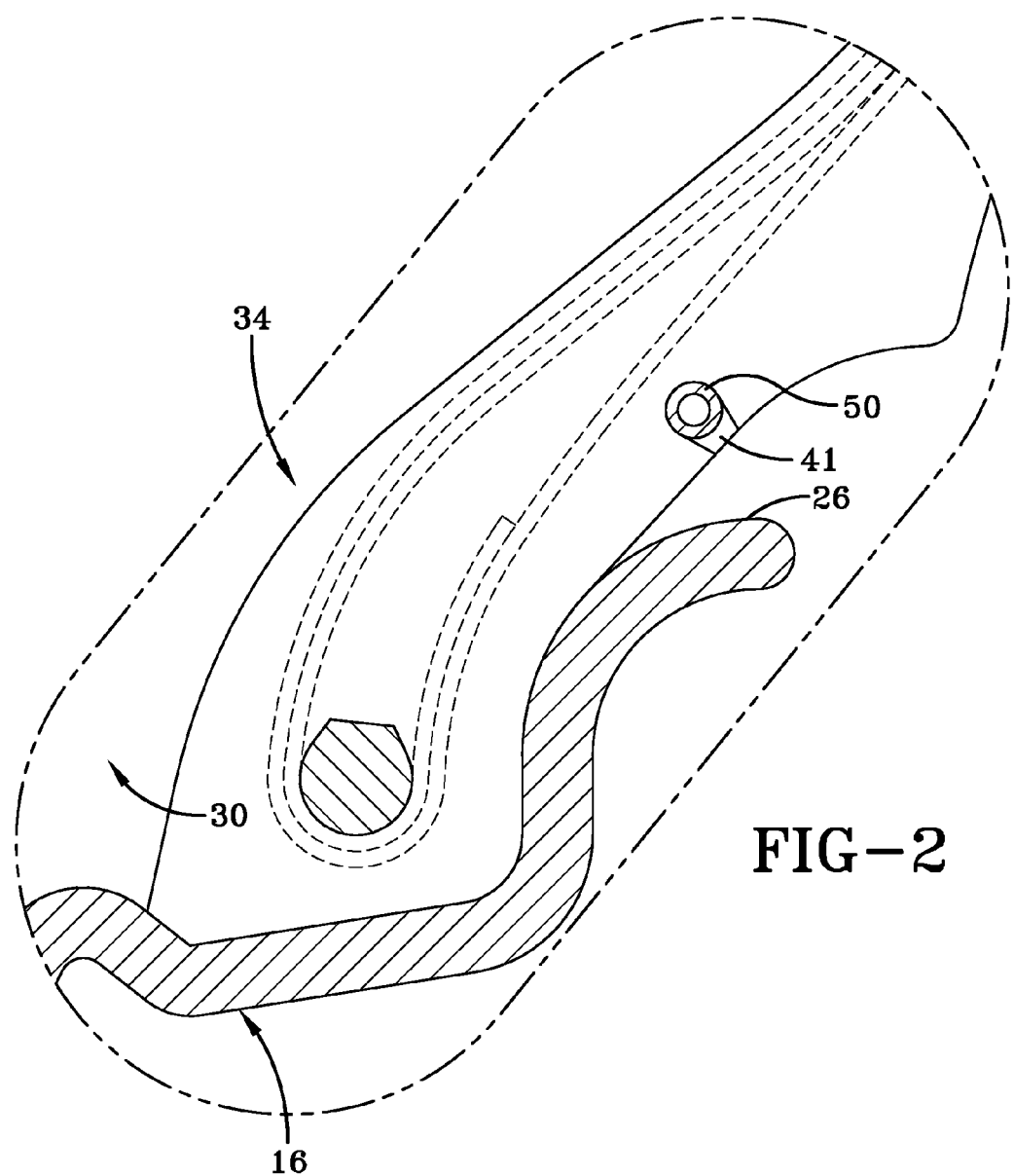
FIG. 2 is a cross-sectional view of the bead area of the tire of FIG. 1.

Referring to FIGS. 1 and 2, a tire assembly 10 of the present invention includes a tire 12 and a pump assembly 14. The tire mounts in a conventional fashion to a conventional tire wheel 16. The tire is of conventional construction, having a ground engaging tread region 38, and a pair of sidewalls 32 extending from the tread to the bead areas 34 mounted on the wheel 16. The tire and wheel enclose a tire cavity 30 for holding pressurized air.

As shown in FIGS. 1 and 2, the pump assembly 14 includes a pump 41 that is assemblied with a passageway 43 located in the sidewall area of the tire, preferably near the bead region. Although the positioning of the pump 41 is specifically shown near the bead region 34 and the rim surface 26, it is not limited to same, and may be located at any region of the tire such as anywhere in the sidewall or tread that undergoes compression.

A passageway 43 is formed in the tire, preferably in the sidewall of the tire and is preferably annular in shape. The pump 41 is made of a tube or a pre-molded tube shape in the tire formed of a resilient, flexible material such as plastic, silicone, elastomer or rubber compounds, and is capable of withstanding repeated deformation cycles when the tube is deformed into a flattened condition subject to external force and, upon removal of such force, returns to an original condition. The tube is of a diameter sufficient to operatively pass a volume of air sufficient for the purposes described herein and allow a positioning of the tube in an operable location within the tire assembly as will be described. Preferably, the tube has a circular cross-sectional shape, although other shapes such as elliptical or lens shape may be utilized.

Figure 5A:
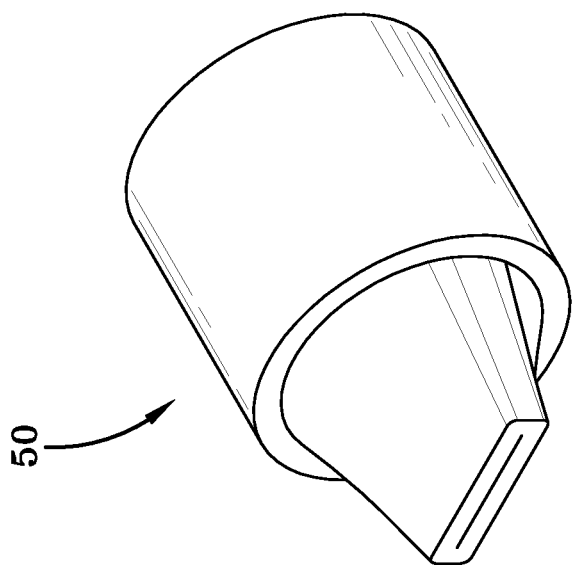
Figure 5B:
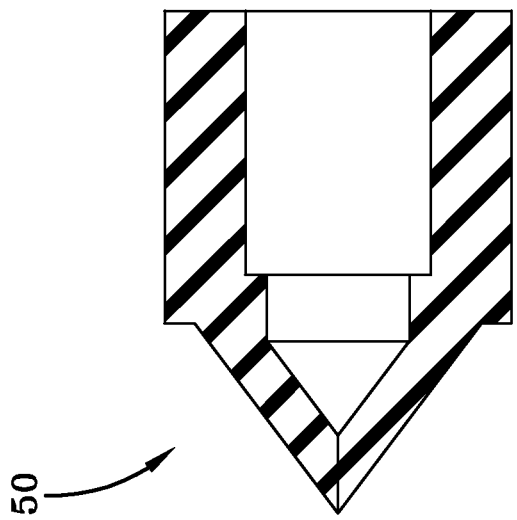
Figure 5C:
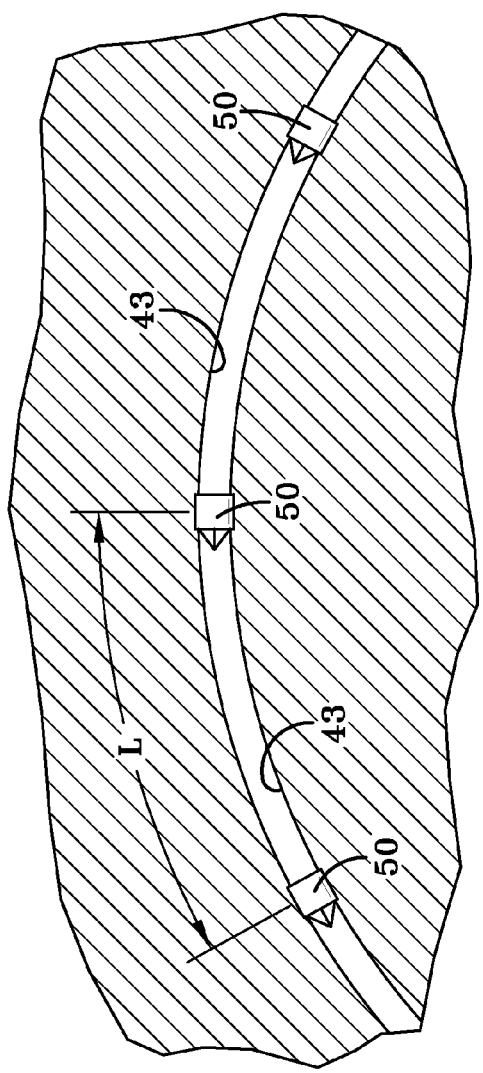
Figure 6:
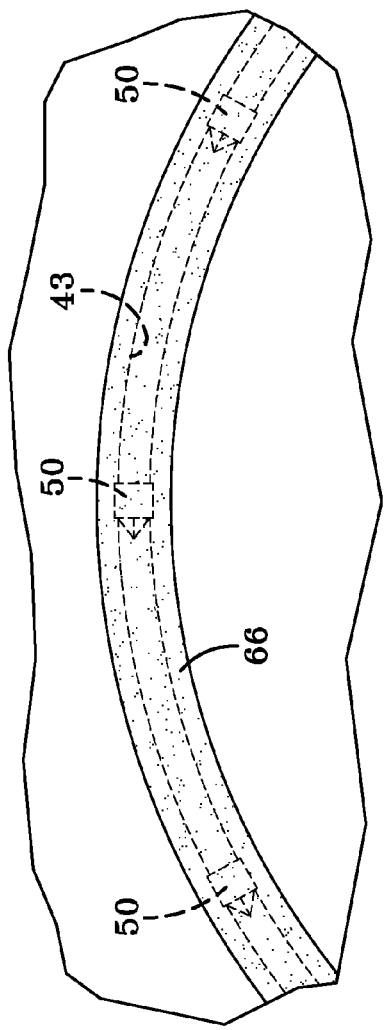

FIG. 4 illustrates how the pump is constructed. The pump is formed from a tube 60 preferably including one or more optional pockets 62 for receiving miniature check valve 50. The miniature check valve is preferably a duckbill check valve, although other type of miniature check valves such as umbrella valve or ball valve may be utilized. The check valves 50 are inserted into the tube 60. If pockets 62 are utilized, the check valves are inserted into each pocket 62 as shown in FIG. 5. The check valves 50 are spaced apart from each other a desired distance L. L may range from about 12 mm to about 150 mm and which depends on tire size/load capacity and tire inflation limit. The check valves are aligned in the same direction. An optional cover strip of rubber 66 as shown in FIG. 6 may be applied over the assembly of FIG. 5.

Figure 3:
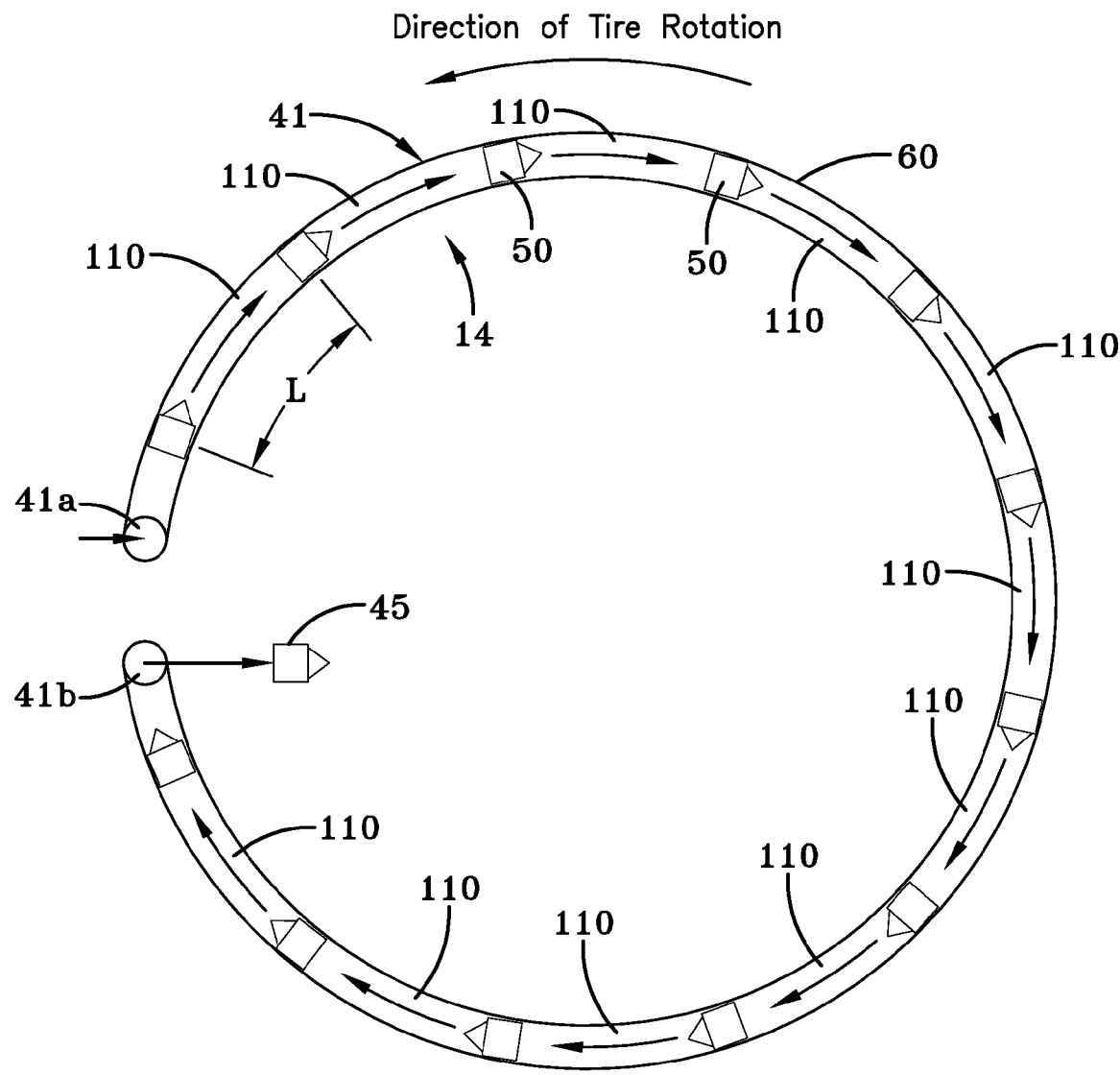
FIG. 3 is a cross-sectional view of a first embodiment of a pump assembly.
Figure 8:
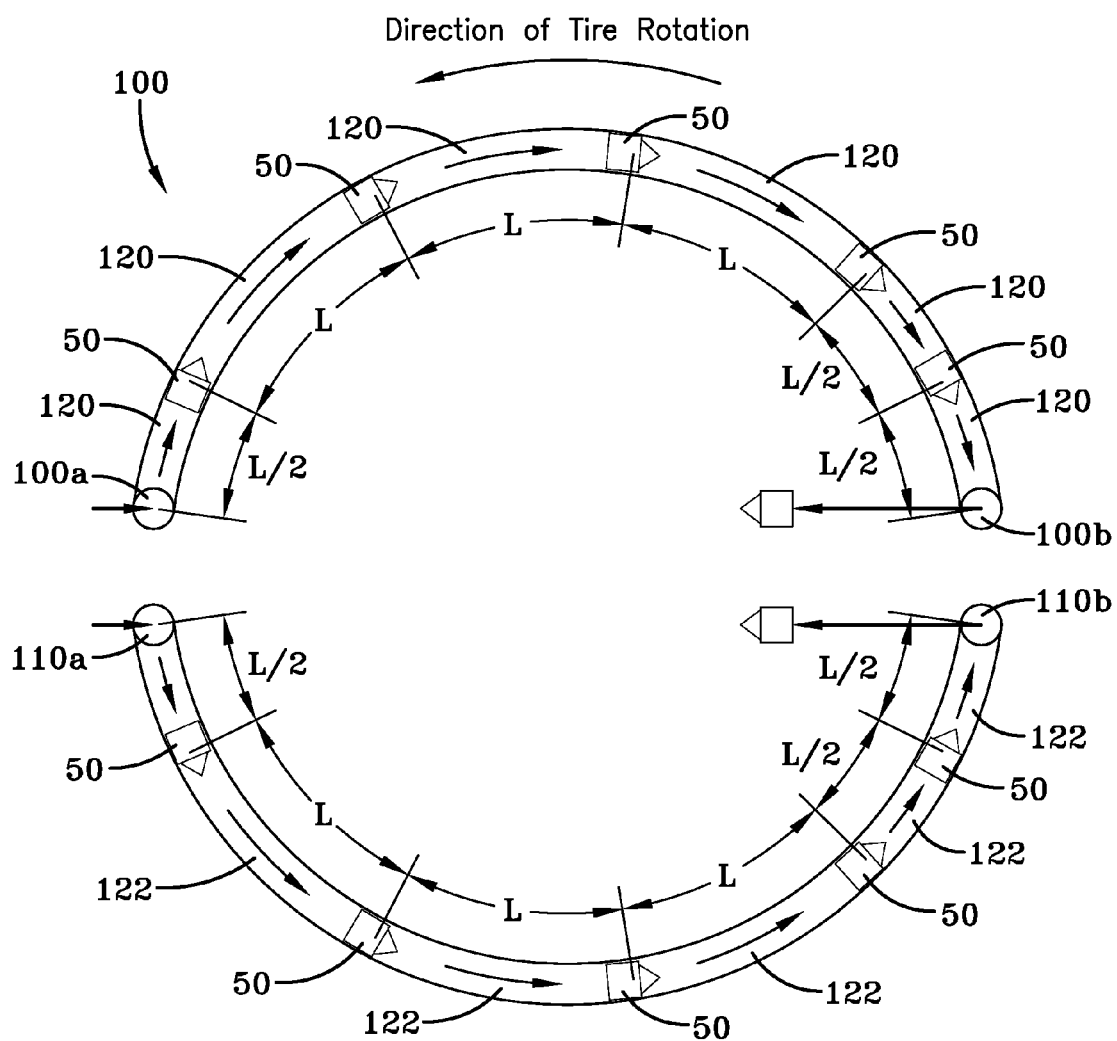
FIG. 8 is a cross-sectional view of a second embodiment of a pump assembly.
Figure 9:
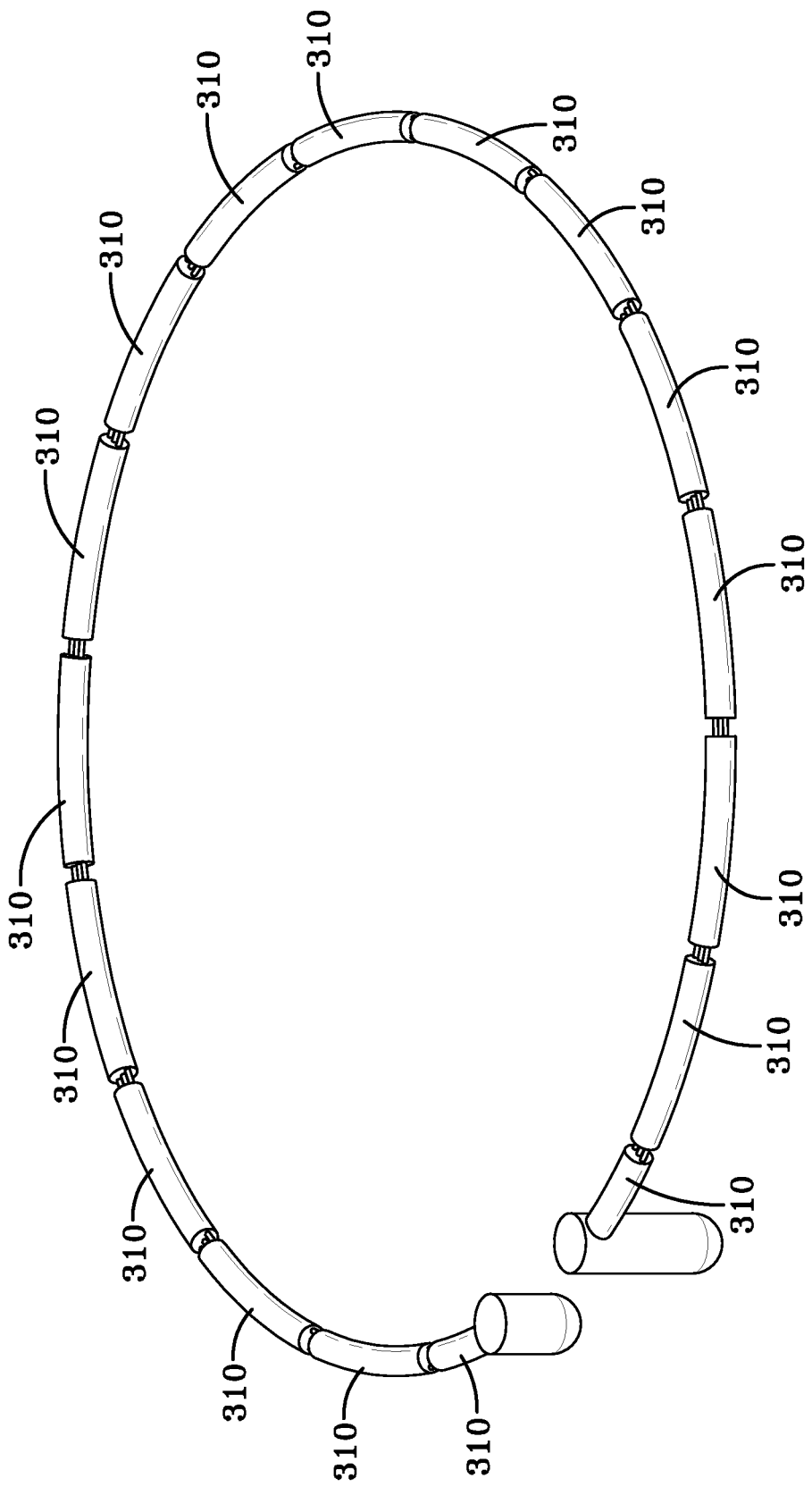
FIGS. 9-12 illustrate a third embodiment of a pump assembly.
Figure 10B:
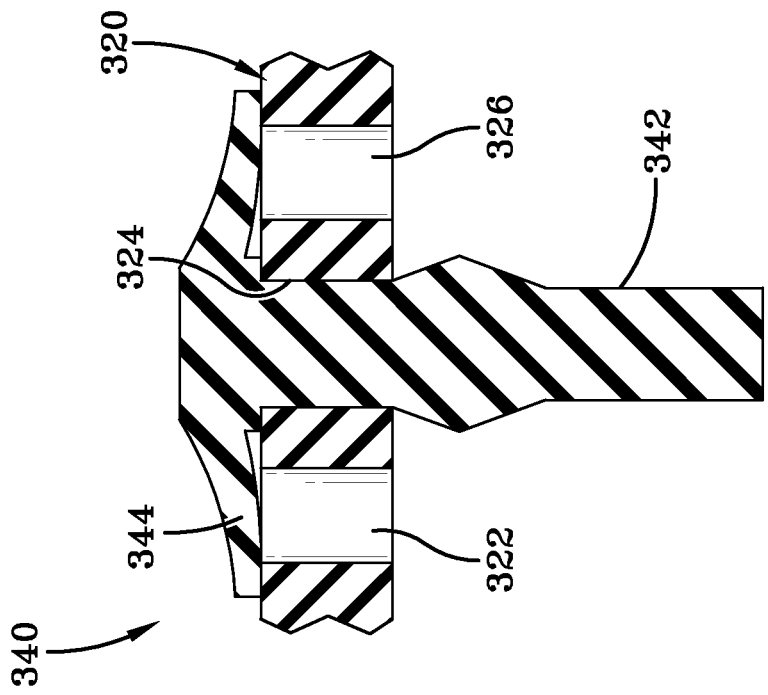
Figure 10A:
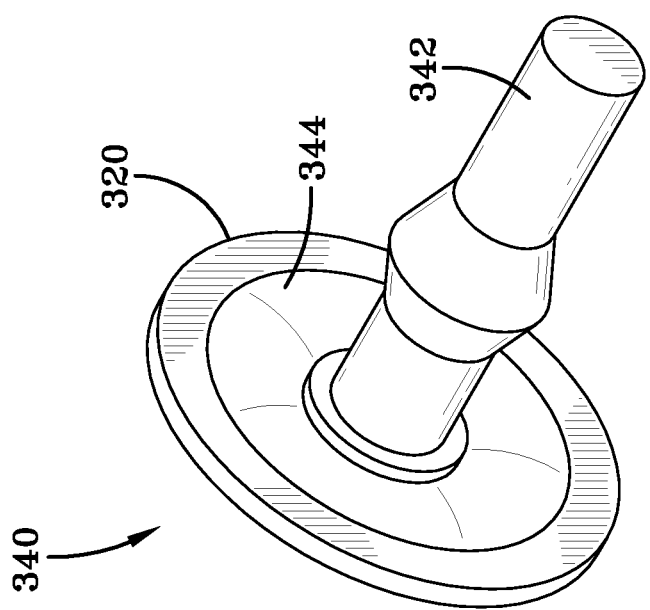

FIG. 3 illustrates the tube 60 arranged into a pump 41. The pump 41 has an inlet end 41a and an outlet end 41b, with the plurality of check valves 50 arranged in the tube and spaced apart a distance L. The inlet end 41a is in fluid communication with the atmospheric air. The tube outlet end is in fluid communication with the tire cavity 30. As shown, the inlet end 41a and the outlet end 41b are spaced apart in the range of about 330-360 degrees. Other variations may be utilized, such as two 180 degree pumps as shown in FIG. 8, or other angular variations such as 270 degrees (not shown), etc. Pump outlet end 41b extends into the tire cavity so that it is in fluid communication with the tire cavity. The outlet end may further include an optional check valve 45 to prevent backflow of air from the cavity into the pump 41.

Figure 7:
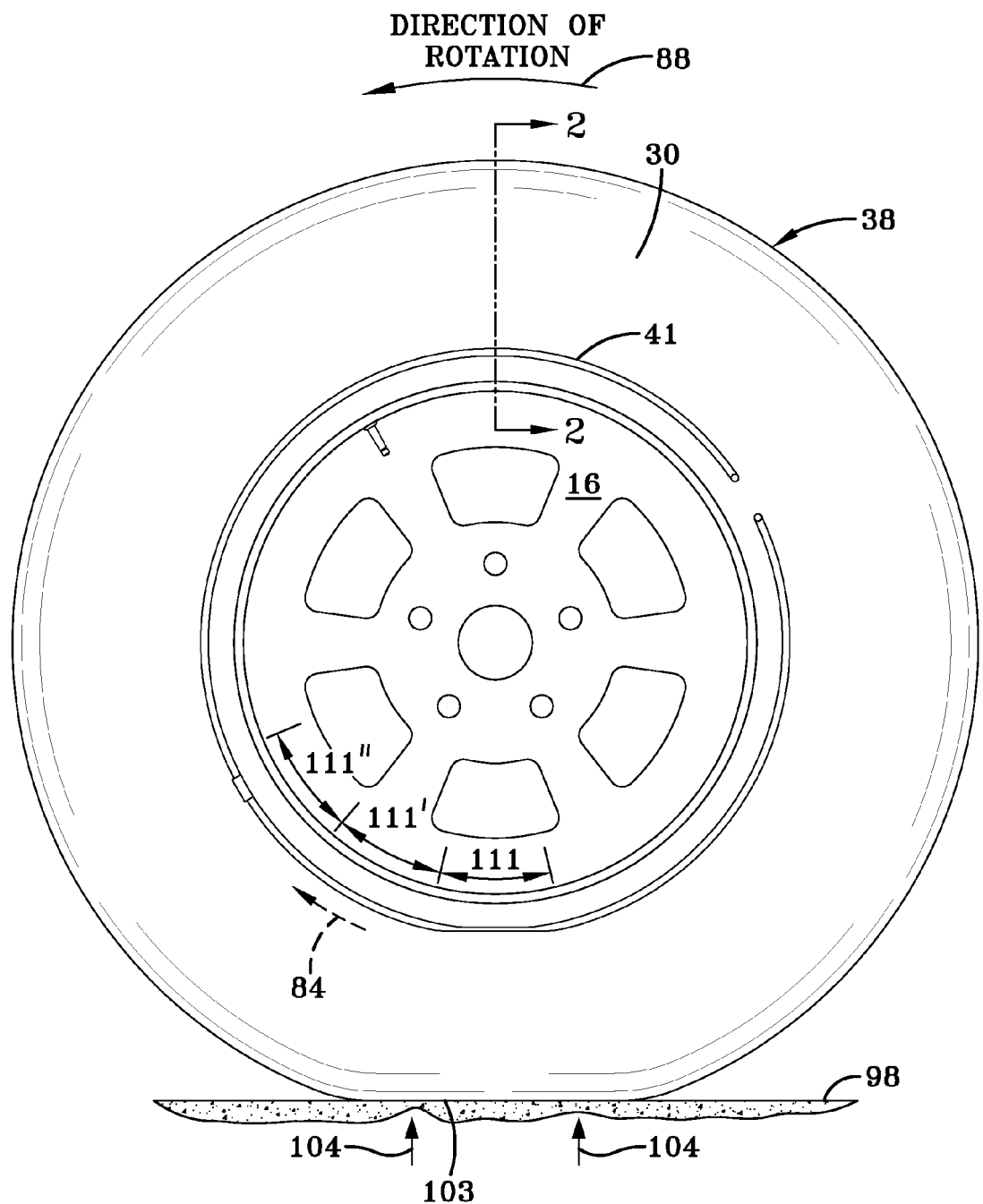
FIG. 7 illustrates a side view of the tire during operation of the pump to the tire cavity when the tire rotates.

As will be appreciated from FIG. 7 and FIG. 3, as the tire rotates in a direction of rotation 88, a footprint 103 is formed against the ground surface 98. A compressive force 104 is directed into the tire from the footprint 103 and acts to flatten a segment 111 of the pump 41. Flattening of the segment 111 of the pump 41 forces air from the flattened segment 111, in the direction shown by arrow 84, through the check valve 50 and into an adjacent segment 110'. The check valves 50 prevents the reverse flow of air (counterclockwise) in each tube segment.

As the tire continues to rotate in direction 88, the pump tube 41 is sequentially flattened or squeezed segment by segment 111, 111', 111" etc. The sequential flattening of the pump tube 41 segment by segment causes the column of air located between the flattened segments to be pumped in the direction 84 to the outlet of the pump and then into the tire cavity. The progression of squeezed or flattened tube segments can be seen to move in a clockwise direction, counter to the tire rotation in direction 88. As segment 111 moves away from the footprint 103, the compression forces within the tire from the footprint region are eliminated and the segment 111 is free to resiliently reconfigure into an unflattened state as segment 111 refills with air from the inlet end. The above-described cycle is then repeated for each tire revolution, each rotation resulting in pumped air going into the tire cavity. Even if the tire rotation direction 88 is the same as direction 84, pump 41 will generate similar pump action in the direction 84 (bi-directional pumping accomplished by check valve controlling the flow direction) with slightly lower pumping efficiency.

FIG. 8 illustrates a second embodiment of first and second pump assembly 100, 110, respectively. The first and second pump assemblies are configured into two 180 degree pumps 100, 110. Each pump 100,110 includes a tube 60 having a plurality of check valves 50 mounted therein. Pump 100 has the plurality of check valves oriented to allow fluid flow in the clockwise direction, opposite the tire rotation. The check valves prevent fluid flow in the direction of tire rotation. Pump 110 has its inlet end 110a oriented adjacent to the inlet end 100a of pump 100. The inlet ends 100a, 110a are each in fluid communication with the atmospheric air. Pump 110 has its check valves 50 oriented to allow fluid to flow in the counterclockwise direction 122, same as the tire rotation direction. Preferably, a check valve 50 is located at a distance L/2 from each inlet end 100a,110a and at a distance L/2 from each outlet end 100b, 110b of the tube. The check valves 50 prevent backflow from the tire cavity into the tubes 100,110. The tube outlet ends 100b,110b are preferably co-located and are each in fluid communication with the tire cavity 30.

The second embodiment of the first and second pump assembly 100,110 works similar in operation to the pump 41 described above. As the tire rotates in the counterclockwise direction, the air in pump 100 is squeezed in the clockwise direction from the tire squeezing the tube under the footprint. Air is forced from one segment 120 through the check valve 50 and then into an adjacent segment. As the tire continues to rotate, air is channeled through the check valves 50 and segments 20 until the air reaches the outlet of the tube. The air is forced into the tire cavity to fill the tire. As the tire rotates into contact with the second pump 110, pumping will continue to occur with slightly lower pumping efficiency as described in section [0028]. This form of assembly provides same pumping efficiency regardless of the tire rotation/mounting direction.

Figure 11:
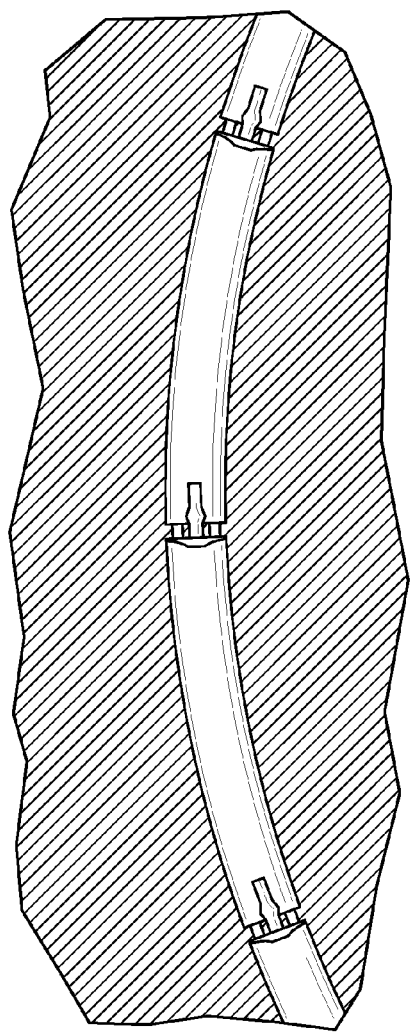
Figure 12:
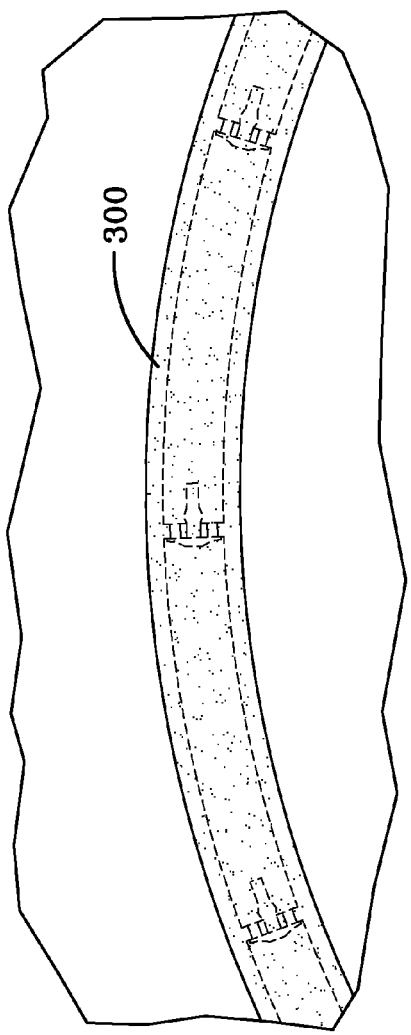

A third embodiment of a pump assembly 300 is shown in FIGS. 9-12. The pump assembly 300 is comprised of a plurality of tube sections 310. Interposed between the tube sections are a plurality of bases 320. Each base 320 is solid in cross-section except for at least two holes 322,324, preferably three holes 322,324,326. A stem 342 of a check valve 340 is inserted in hole 324. The check valve 340 having a circular portion 344 which is positioned to cover the holes 322, 326. The tube segments are joined together with the bases 320 housing the check valves, so that the check valves are all aligned in the same direction as shown in FIG. 11. An optional cover strip may be applied over the tube, base and check valve assembly as shown in FIG. 12.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
 a tire having a tire cavity, first and second sidewalls extending respectively from first and second tire bead regions to a tire tread region;
 a passageway in the tire, a pump positioned in the passageway, said pump including a tube, a plurality of check valves mounted in said tube and spaced apart from each other and forming a plurality of tube segments, said tube having a first end in fluid communication with the atmosphere, and a second end in fluid communication with the tire cavity.

2. The self inflating tire assembly of claim 1 wherein a check valve is positioned at the first end of the tube.

3. The self inflating tire assembly of claim 1 wherein a check valve is positioned at the second end of the tube.

4. The self inflating tire assembly of claim 1 wherein the passageway is formed in the sidewall.

5. The self inflating tire assembly of claim 1 wherein the passageway annular.

6. A self-inflating tire assembly comprising:
- a tire having a tire cavity, first and second sidewalls extending respectively from first and second tire bead regions to a tire tread region;
- a passageway in the tire, a first and second pump positioned in the passageway, each pump including a tube, a plurality of check valves mounted in said tube and spaced apart from each other and forming a plurality of tube segments, said tube having a first end in fluid communication with the atmosphere, and a second end in fluid communication with the tire cavity;
- wherein the first pump has the check valves oriented in a first flow direction, and the second pump has the check valves oriented in a second flow direction opposite the first flow direction.

7. The self inflating tire assembly of claim 6 wherein the first and second pumps have their respective tube inlets co-located.

* * * * *